United States Patent
McKenney

(10) Patent No.: US 7,092,429 B1
(45) Date of Patent: Aug. 15, 2006

(54) MULTI-PASS FREQUENCY HOP-ACQUISITION CORRELATOR

(75) Inventor: Michael F. McKenney, Anaheim, CA (US)

(73) Assignee: Interstate Electronics Corporation, Anaheim, CA (US)

( * ) Notice: Subject to any disclaimer, the term of this patent is extended or adjusted under 35 U.S.C. 154(b) by 707 days.

(21) Appl. No.: 10/256,258

(22) Filed: Sep. 26, 2002

Related U.S. Application Data

(60) Provisional application No. 60/325,375, filed on Sep. 26, 2001.

(51) Int. Cl.
*H04B 1/69* (2006.01)
*H04B 1/707* (2006.01)
*H04B 1/713* (2006.01)

(52) U.S. Cl. .................. 375/132; 375/343; 375/367; 708/403; 708/404; 708/405; 708/422

(58) Field of Classification Search ............. 375/132, 375/343, 367; 708/403, 404, 405, 422
See application file for complete search history.

(56) References Cited

U.S. PATENT DOCUMENTS

| | | | |
|---|---|---|---|
| 5,237,587 A | 8/1993 | Schoolcraft | |
| 5,414,729 A | 5/1995 | Fenton | |
| 5,574,454 A | 11/1996 | Wilson et al. | |
| 5,646,626 A | 7/1997 | Willis | |
| 5,974,080 A | 10/1999 | Papasakellariou | |
| 6,005,887 A | 12/1999 | Bottomley et al. | |
| 6,028,883 A | 2/2000 | Tiemann et al. | |
| 6,111,911 A | 8/2000 | Sanderford, Jr. et al. | |
| 6,278,403 B1 | 8/2001 | Peng et al. | |
| 6,298,083 B1 | 10/2001 | Westcott et al. | |
| 6,335,947 B1 | 1/2002 | Lattard et al. | |
| 6,363,108 B1 | 3/2002 | Agrawal et al. | |
| 6,452,961 B1 | 9/2002 | Van Wechel | |
| 6,466,958 B1 | 10/2002 | Van Wechel et al. | |
| 6,567,833 B1 | 5/2003 | Van Wechel et al. | |
| 6,643,678 B1 | 11/2003 | Van Wechel et al. | |
| 2001/0014114 A1* | 8/2001 | Baltersee et al. | 375/148 |
| 2002/0141506 A1* | 10/2002 | Chen | 375/262 |
| 2002/0150182 A1* | 10/2002 | Dogan et al. | 375/343 |
| 2003/0099280 A1* | 5/2003 | Kumar et al. | 375/130 |

* cited by examiner

*Primary Examiner*—Jean B. Corrielus
*Assistant Examiner*—Erin M. File
(74) *Attorney, Agent, or Firm*—Knobbe Martens Olsen & Bear LLP

(57) ABSTRACT

A multi-pass frequency hop timing acquisition correlator that produces a more accurate time estimate from the fast acquisition frequency hop signal is disclosed. The time estimate produced by the multi-pass acquisition correlator is more accurate than the ¼ hop estimate produced by single-pass fast acquisition correlators. The multi-pass frequency hop timing acquisition correlator uses a time estimate generated by a previous pass through the multi-pass frequency hop timing acquisition correlator as a starting point for computing a new, more accurate, time estimate. Thus, the second pass through the multi-pass frequency hop timing acquisition correlator produces a time estimate that is relatively more accurate than the time estimate produced by the first pass. The more accurate time estimate produced by the multi-pass acquisition correlator reduces the hardware and time needed by the direct acquisition process to acquire the M-code. In one embodiment, the multiple-pass frequency-hop correlator on the second or third pass provides microsecond-level timing from a GPS M-code fast acquisition frequency hop signal in a jamming environment.

14 Claims, 6 Drawing Sheets

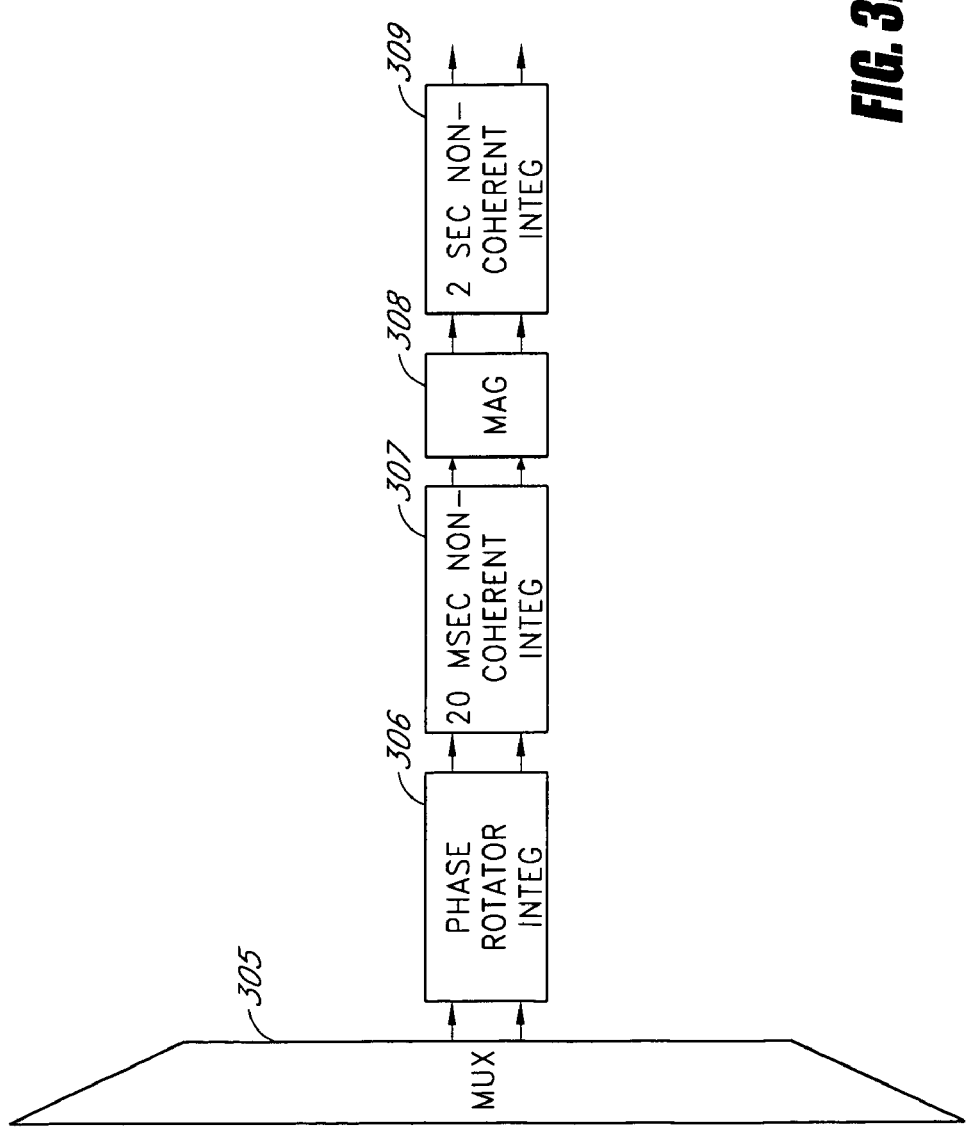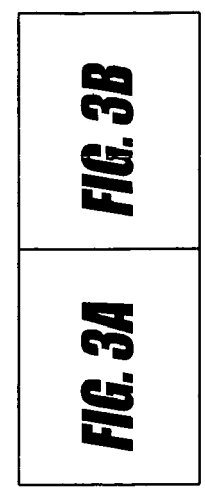

MULTI-PASS FREQUENCY HOP-ACQUISITION CORRELATOR

REFERENCE TO RELATED APPLICATIONS

The present application claims priority from U.S. Provisional Application No. 60/325,375, filed Sep. 26, 2001, titled "MULTI-PASS FREQUENCY HOP ACQUISITION CORRELATOR," the entire contents of which is hereby incorporated by reference.

BACKGROUND

1. Field of the Invention

The present invention relates to techniques for acquiring synchronism to a spread spectrum code in a Global Position Satellite (GPS) system.

2. Description of the Related Art

A transformation of the Global Positioning System (GPS) from a military service with the guarantee of civil use to a true dual service is one of the GPS modernization goals. The transformation includes a new military code (M-code) and an acquisition signal for acquiring the M-code. The modulation method used for the M-code produces a spectrum that exhibits a null at the carrier frequency of the C/A-code. This allows the M-codes to be transmitted along with the existing C/A-codes and P(Y) codes.

The M-code signal is a military data modulation multiplied by a spreading code modulation. The M-code acquisition includes a frequency hop acquisition signal that allows for fast acquisition of the M-code in a jamming environment. A fast acquisition processor uses the frequency hop signal to develop a time estimate that is provided to a direct acquisition processor for direct acquisition of the M-code. The hopper approach to fast acquisition involves transmitting a series of discrete tones from the Satellite Vehicle (SV) at approximately the same signal level as the GPS signal. The actual frequency of these ±5 to ±12 MHz tones are controlled by the M-Code sequence making them secure and unique for any given time. The actual rate of change of these frequencies (hopping) would be at intervals of 1, 5, 10, or 20 milliseconds or the like. By matching the hop signal with all of the possible hop patterns over the period of the known time uncertainty, it is possible to reduce the time error to less than ¼ of the hop interval. To minimize losses caused by the misalignment of the frequency hops between the SV and the receiver, the receiver uses two de-hoppers for each hop interval in the desired time uncertainty spaced at intervals of 0.5, 2.5, 5, or 10 milliseconds. This reduces the residual misalignment of the hops (time error) to one quarter of the hop interval. Currently the Fast Acquisition needs to account for a time uncertainty of ±10 seconds and a frequency uncertainty of ±1600 Hz.

The time estimate produced by the fast acquisition correlator is provided to a direct acquisition processor that actually acquires the M-code. Unfortunately, the ¼ hop interval residual time error left by the fast acquisition processor results in a relatively large time window to be searched by the direct acquisition processor. To minimize acquisition hardware and time, it is desirable to reduce this residual error as much as possible.

SUMMARY

The present invention solves these and other problems by providing a multi-pass frequency hop timing acquisition correlator that produces a more accurate time estimate from the fast acquisition frequency hop signal. The time estimate produced by the multi-pass acquisition correlator is more accurate than the ¼ hop estimate produced by prior art acquisition correlators. The more accurate time estimate produced by the multi-pass acquisition correlator reduces the hardware and time needed by the direct acquisition process to acquire the M-code.

In one embodiment, a multiple-pass frequency-hop correlator provides microsecond-level timing on the second (or third) pass and in higher jamming than for the presently-used direct-sequence digital matched filters or parallel correlators. The second pass can achieve timing down to the microsecond level, in high jamming.

One embodiment, provides significant saving in gates, power, and cost of a Military GPS receiver designed to acquire M-code in high jamming and in relatively short time with a relatively large initial time error. A prior art direct-Y correlator requires initial time accuracy to the level of 1 millisecond or less, and then can only obtain acquisition at jamming to signal ratios below 50 dB. The multiple-pass frequency hop correlator can start with large time errors of 20 seconds, or even an hour or more, and obtain time to 20 milliseconds (for 20 msec hops) after the first pass. After the second pass, timing errors are reduced to the microsecond level, which is sufficiently accurate to hand off the acquisition to the direct acquisition processor, without the with large initial time offsets, the frequency hop approach can operate in higher jamming. This results in a saving in gates, and consequently lower cost and power. The advantage of reducing cost and power is important in many applications, including, but not limited to handheld GPS receivers and GPS receivers used in expendable devices.

DETAILED DESCRIPTION

Figure 1:
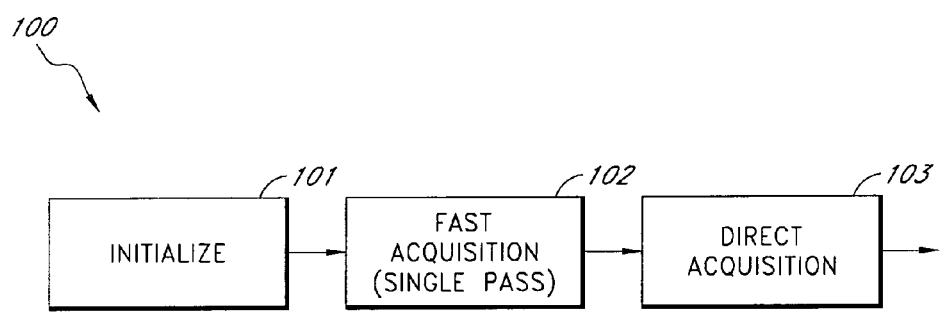
FIG. 1 is a block diagram showing single-pass acquisition of a frequency hop acquisition signal.

FIG. 1 is a block diagram 100 showing single-pass acquisition of a frequency hop acquisition signal, beginning with an initialization block 101. The initialization block 101 provides initialization parameters to a single-pass fast acquisition block 102. The single-pass fast acquisition block 102 provides a time estimate to the direct acquisition block 103.

The single-pass fast acquisition block 102 matches the M-code frequency hop acquisition signal with all of the possible hop patterns over the period of a time uncertainty. The initialization parameters provided by the initialization block 101 can include inter alia the time uncertainty and an initial time estimate. To minimize losses caused by the misalignment of the frequency hops between the SV and the receiver, the single-pass fast acquisition block 102 uses two de-hoppers for each hop interval in the desired time uncertainty spaced at intervals of 0.5, 2.5, 5, 10 milliseconds, etc. This reduces the residual misalignment of the hops (time error) to one quarter of the hop interval. Unfortunately, the ¼ hop interval residual time error left by the single-pass fast acquisition block 102 results in a relatively large time window to be searched by the direct acquisition block 103. It is desirable to reduce this residual error as much as possible.

Figure 2:
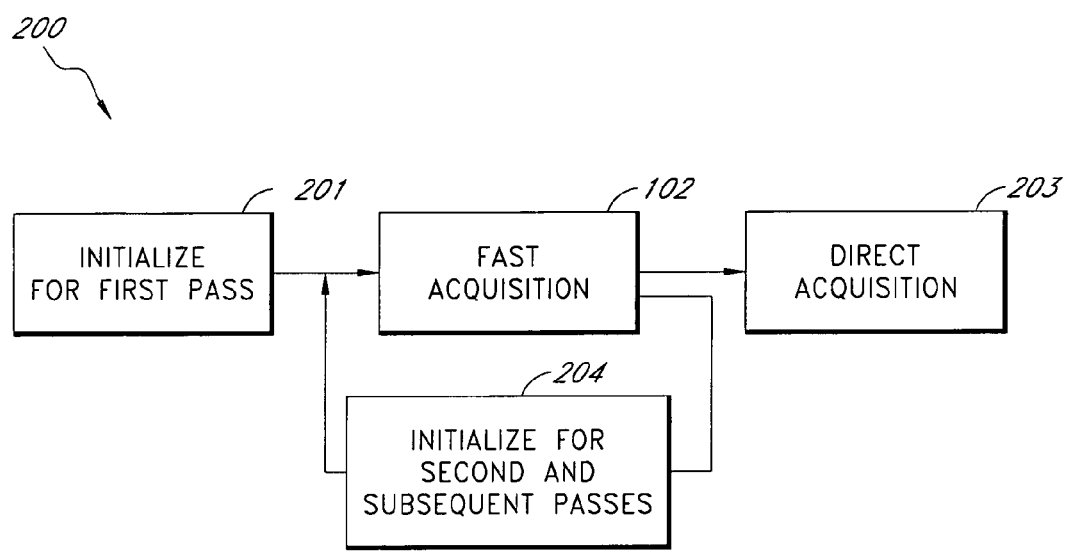
FIG. 2 is a block diagram showing multi-pass acquisition of a frequency hop acquisition signal.

FIG. 2 is a block diagram 200 showing a multi-pass acquisition of a frequency hop acquisition signal, beginning with a first-pass initialization block 201. The first-pass initialization block 201 provides first-pass initialization parameters to a multi-pass fast acquisition block 202. A second-pass initialization block 204 provides initialization parameters to the multi-pass fast acquisition block 202 for second and subsequent passes. The multi-pass fast acquisition block 202 provides a time estimate to a direct acquisition block 203.

The second-pass initialization block 204 and the multi-pass fast acquisition block 202 together from a fast acquisition loop that is repeated as necessary to produce a time estimate with the desired accuracy. The time estimate is refined on each pass through the loop.

Figure 3A:
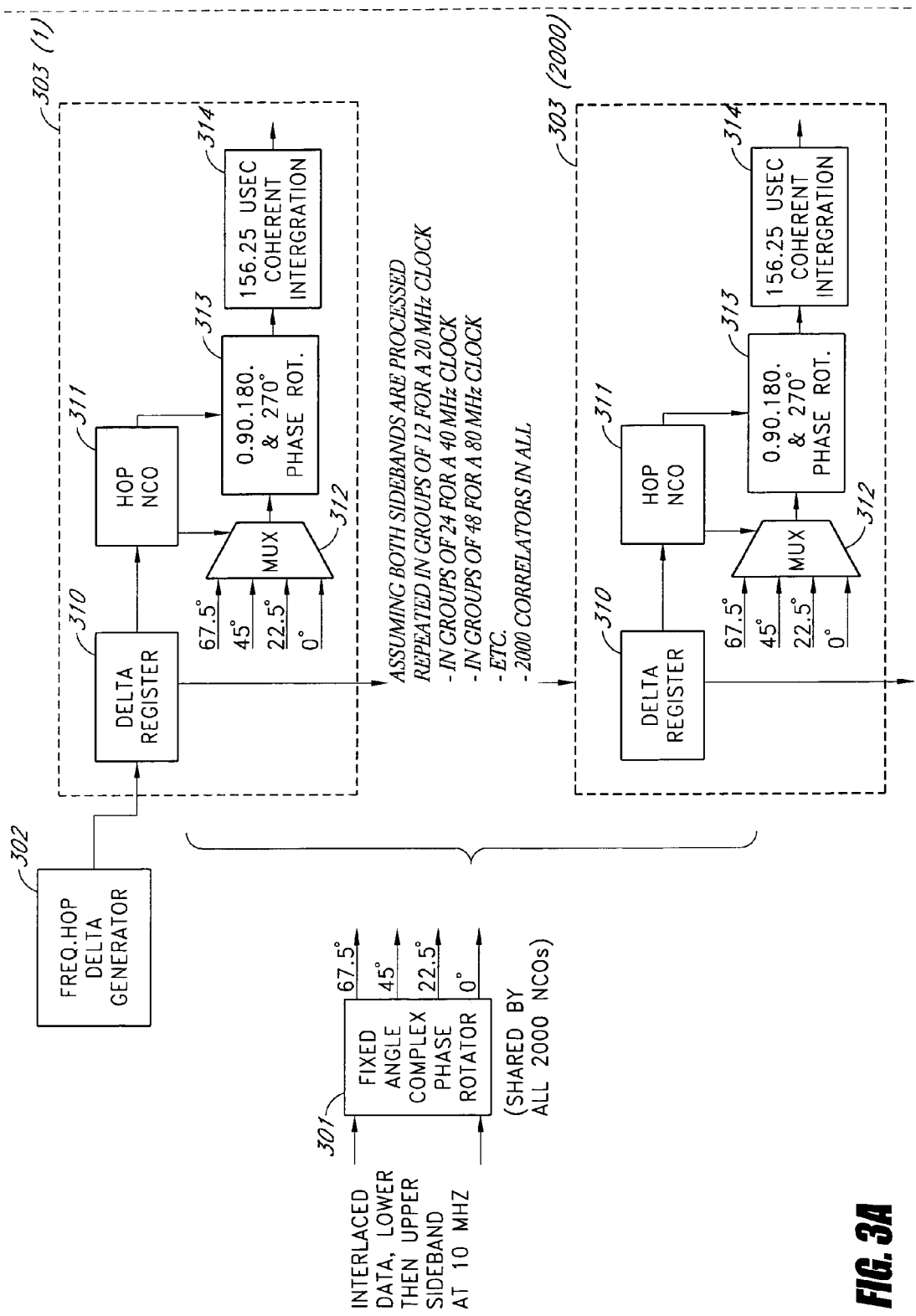
FIG. 3 is a block diagram showing an implementation of a frequency hop processor for M-code.

The block diagram of FIG. 3 shows one embodiment, if an M-code frequency hop processor 300 that can be used to implement the multi-pass fast acquisition block 202. The processor 300 uses 2000 correlators 300, shown in FIG. 3 as a first correlator 303(1) and a 2000$^{th}$ correlator 303(2000). Each correlator 303 and includes a delta register 310. An output from the delta register 310 is provided to the next correlator in the sequence of 2000 correlators. A time output from the delta register 310 is provided to a control input of a numerically controlled oscillator (NCO) 311. A rotating frequency output from the NCO 311 is provided to a multiplexer 312 and to a quadrature phase rotator 313. An output from the phase rotator 313 is provided to a coherent integrator 314. The multiplexer 312 is a four-input multiplexer having inputs corresponding to phase rotations of 0 deg., 22.5 deg, 45 deg., and 67.5 deg. Working together, the multiplexer 312 and the phase rotator 313 can produce any phase rotation, with a worst case error of 11.25 deg.

A frequency hop delta generator 302 provides frequency delta information to the delta register 310. A fixed angle complex phase rotator 301 receives interlaced data (lower sidebands interlaced with upper sidebands) and produces outputs with fixed phase rotations of 0 deg., 22.5 deg, 45 deg., and 67.5 deg. The phase rotate outputs from the fixed angle complex phase rotator 301 are provided to the multiplexer 312 in each of the 2000 correlators 303. Outputs from all of the 2000 correlators 303 are provided to a multiplexer 305. Outputs from the multiplexer 305 are provided to a phase rotator 306. Outputs from the phase rotator 306 are provided to a coherent integrator 307. Outputs from the coherent integrator 307 are provided to a magnitude block 308. Outputs from the magnitude block 308 are provided to a non-coherent integrator 309.

The processor 300 uses DFTs rather than FFTs by way of example, and not by way of limitation. One of ordinary skill in the art will recognize that FFT or DFT processes can be used. Both FFT and DFT processes are, in general, mathematically equivalent. One benefit of the FFT over the DFT is obtained for large transforms because the computations increase as N Log(N) rather than N² as the number of desired frequency bins is increased. However, for small numbers of bins, such as 32 or less, there is often no advantage in an FFT implementation. The DFT usually turns out to be simpler in such cases. Moreover, the DFT eliminates input memories along with the need to double buffer the input memories, eliminates output memories, and internal computational memories. The DFT has the advantage of taking the data in a sample at a time and outputting it a sample at a time. Also, it can be easily multiplexed (with additional memory) as shown in the processor 300.

In one embodiment, a typical M-code acquisition processor 300, searches a 20 second by 3025 Hz uncertainty with a 20 msec coherent interval. The delta generator 302 provides the timing between correlators 303 (e.g., 10 msec, 1 msec, etc.) To ensure that at least one frequency hopper is directly aligned with the satellite, on the first pass, the delta values of the delta registers 310 are updated every 10 msec. With an uncertainty of 20 seconds this results in the implementation of 2000 frequency hoppers in the processor 300. A 20 msec coherent interval results in a 50 Hz bin resolution but to cover the 3015 Hz frequency uncertainty with minimum loss the bin resolution must be at least 6030 Hz. To satisfy these conflicting requirements, the coherent accumulator 314 for each correlator has an integrate and dump interval of 156.25 usec resulting in a bin resolution (frequency range ahead of the FFT or DFT) of the reciprocal of this (i.e., 6400 Hz).

A block of 128 complex samples out of each correlator 303 is zero padded for processing by a 256 point FFT and this results in 128 bins of 50 Hz width spaced at 25 Hz intervals covering the ±1600 Hz range around the frequency hopper mean. This implementation would not require an FFT processor for each frequency hopper since each FFT can be capable of processing the data from multiple frequency hoppers in the 20 msec it takes to collect the next data set. This sharing of the FFT processor means that the collection memory out of each of the frequency hoppers is doubled-buffered making it 256 complex words long. Each of the 256000 complex outputs from this process are be translated to magnitude and individually non-coherently integrated over an interval of 2 seconds (100 frequency hops) to give a 99% probability of detection. The above process results in a reduction in the time uncertainty from 20 seconds to 20 msec and a reduction in the frequency uncertainty from 3015 Hz to 50 Hz.

An additional reduction in the time and frequency uncertainties before going to a direct-M search is highly desirable. This can be accomplished by resetting the acquisition processor frequency tuning and hop generator 302 based on the results of the previous pass. Running the processor again with a 20 usec update rate for the delta values of the frequency hoppers, and doing a best fit interpolation on the resulting data sets, can reduce the time uncertainty to less than 40 usec and the frequency uncertainty to less than 10 Hz. Because the first pass establishes the detection criteria, this second pass would typically not require the full 2 second non coherent collection interval. This extra pass speeds up the subsequent direct-M search.

The update rate for the frequency hopper delta values in the delta registers 310 are programmed by the delta generator 302 to different values. The update rate can be adjusted based on the accuracy of the time initialization. Thus, for example, on a first pass through the fast acquisition processor 300 (when the time initialization is rather inaccurate), the delta generator 302 will program a relatively long update interval (e.g., 10 msec.). The output of the first pass through the fast acquisition processor 300 is a time estimate what is rather more accurate than the initial time estimate. Thus, on a second pass through the fast acquisition processor 300 the time estimate from the first pass is used as the time initialization, and the delta generator 302 programs a relatively short update interval. The output from the second pass is a time estimate that is more accurate than the time estimate produced by the first pass.

With the above second pass in place, then the required number of frequency hoppers in the search receiver will typically be reduced by increasing the satellite hop dwell time from 20 msec to some longer interval. For instance, if the dwell was set to 40 msec, then the number of frequency hoppers could be reduced to 1000 from 2000 with an update rate of 20 msec. The number of required FFT bins would not be reduced since twice as many would be needed to cover the frequency uncertainty of each frequency hopper but the final frequency estimate would be twice as accurate. Note that 4 seconds of non-coherent integration time would be used for the first pass to cover 100 frequency hops, and thus the second pass may, in some circumstances reduce the time uncertainty to 40 usec.

A variation of the above approach can reduce the number of frequency hoppers to 500 and halve the number of FFT bins for a 40 msec dwell time. If the update rate of the frequency hoppers in this case was 40 msec instead of 20 msec then there would be an additional time alignment loss during the search of 3.5 dB. However, if the change from a 20 msec dwell to a 409 msec dwell was made without a commensurate reduction in the transmitted power of the frequency hopper, then the additional 3 dB gain would result in a net loss of only 0.5 dB during the search.

Assuming a 20 MHz clock, and only processing one of the side bands, then the processor 300 would use approximately 25 FFT processors and each of these would be followed by a non-coherent processor. Each FFT would process 80 frequency hopper outputs interfaced via dual-port double-buffered memories. Memory size per FFT in this case would be approximately 622 KBits and total memory size would be 15.5 MBits. Alternately, a single non-coherent processor could be used, but this would typically require output memory to interface the FFTs to the processor. In this case memory size would increase to 930 KBits per FFT for a total of 23.25 MBits. Since the data is arriving from the correlators 303 sequentially, it is possible to replace the FFTs with DFTs. Assuming the same 20 MHz clock and only one side band, then each DFT would process the outputs from 24 frequency hoppers. This would require a total of 83 DFT processors and each would be followed by a non-coherent processor. The memory size per DFT would be approximately 117 KBits and total memory size would be 9.7 MBits. Alternately, a single non-coherent processor could be used with memory interfacing the DFT outputs to the processor. This would double the memory size to 233 KBits per DFT or 19.4 MBits total.

An examination of how the correlator outputs are related to each other when they are fully or partially aligned shows that using magnitude instead of power would result in a much simpler calculation (under the assumption that the three adjacent correlators are exposed to the same noise data). This assumption is not strictly true since the three adjacent hoppers are offset in time from each other by ½ of the hop interval. However, with the exception of the beginning and end of the collection period, all three of the adjacent correlators do gather data from the same area of the spectrum, albeit at slightly different times. The resulting difference between correlators would be relatively small if the collection period is significantly longer than the hop interval but, of course, any difference will contribute to some residual calculation error.

The portion of the magnitude data collected in any individual hop correlator that represents the transmitted signal is directly related to the percentage of time the hop correlator is properly aligned with the transmitted signal.

Figure 4:
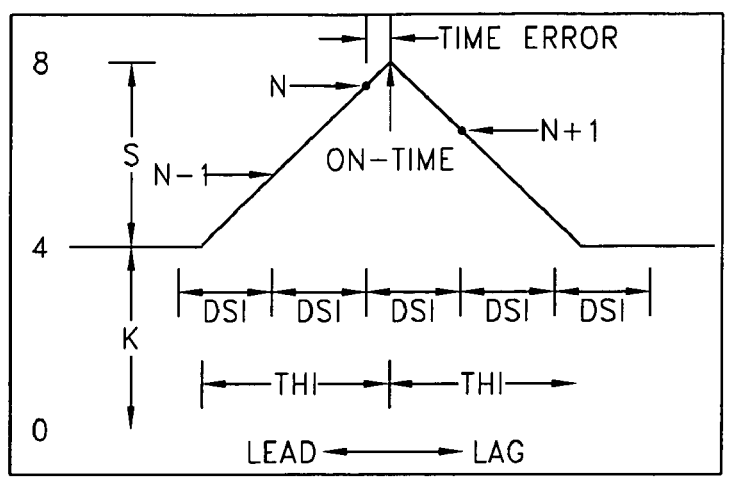
FIG. 4 shows lead and lag timing during the first pass of the frequency hop correlator.

Thus:

$$H=(C*S)+K$$

where H represents the magnitude of the data collected by the correlator, C represents the fractional representation of how well the correlator was aligned with the signal, S represents the magnitude the signal would contribute if fully aligned with the correlator, and K represents all non-signal components that contributed to the magnitude collected by the correlator. FIG. 4 is a plot showing S, K, and the outputs of three adjacent correlators ($H_{N-1}$, $H_N$, and $H_{N+1}$) It is possible to express the collected magnitudes of the three adjacent correlators as;

$$H_{N-1}=(C_{N-1}*S)+K_{N-1}$$

$$H_N=(C_N*S)+K_N$$

$$H_{N+1}=(C_{N+1}*S)+K_{N+1}$$

At first glance the above three equations do not appear to be solvable since there are 7 unknowns and only 3 knowns. However, if it is assumed that $K_{N-1}=K_N=K_{N+1}$, then:

$$H_{N-1}=(C_{N-1}*S)+K$$

$$H_N=(C_N*S)+K$$

$$H_{N+1}=(C_{N+1}*S)+K$$

There are still 5 unknowns but, these can be resolved, by taking advantage of the fact that the correlators are equally spaced in time. The difference for C between two adjacent correlators that both lead the transmitted hop on-time point is equal to the Correlator Spacing Interval (DSI) divided by the Transmitted Hop Interval (THI). For the case where the spacing interval is ½ of the hop interval, the difference in these two coefficients is 0.5. Assuming the on-time point resides between correlators N and (N+1) then correlators N and (N−1) are both leading the On-Time point and S can be calculated using;

$$H_N-H_{N-1}=((C_N*S)+K)-((C_{N-1}*S)+K)$$

Which simplifies to;

$$H_N-H_{N-1}=(C_N-C_{N-1})*S$$

S can then be solved for by substituting 0.5 for $(C_N-C_{N-1})$ and rewriting the equation as;

$$S=2*(H_N-H_{N-1})$$

Similarly, the sum for C for two adjacent correlators that span the On-Time point is equal to two minus the DSI divided by the THI. For the case where the spacing interval is ½ of the hop interval the sum of these two coefficients is 1.5. Again assuming the On-Time point resides between correlator N and (N+1) then K can be calculated using;

$$H_N+H_{N+1}=((C_N*S)+K)+((C_{N+1}*S)+K)$$

Which simplifies to;

$$H_N+H_{N+1}=(C_N+C_{N+1})*S+2K$$

K can then be solved for by substituting 1.5 for $(C_N+C_{N+1})$ and rewriting the equation as;

$$K=((H_N+H_{N+1})-1.5S)/2$$

If the equation;

$$H=(C*S)+K$$

is rewritten;

$$C=(H-K)/S$$

$C_N$ can now be calculated for correlator $H_N$ using the established values for S and K. Once $C_N$ has been determined the following calculation gives an estimate of the amount of time (Time Error) that correlator $H_N$ Leads the On-Time point by.

$$\text{Time Error}=(1-C_N)*THI$$

When the transmitted on-time point is between correlators (N−1) and N then the roles of (N+1) and (N−1) are reversed in the above equations and the Lead becomes a Lag. This condition can be detected by checking to see if the output of correlator (N−1) is greater than correlator (N+1). This is shown, for example, in FIG. 4 where $H_{N+1}>H_{N-1}$ so the time error leads.

Errors in the time estimations are due to non-signal contributors to the magnitudes, sin(x)/x spreading caused by imperfect frequency alignment, and losses due to time alignment errors. The third cause, time alignment errors, causes the signal magnitude (S) collected in adjacent correlators to be lower than that in the center correlator. In the case of the adjacent correlator used in the S calculation the signal magnitude is lower than that in the center correlator by 6 to 10 dB. For the adjacent correlator on the other side that is used for calculating K the signal magnitude is reduced by 0 to 6 dB.

The accuracy of the calculations can be dramatically improved if the signal magnitude in the adjacent collectors is not so heavily attenuated. This can be accomplished by making a second detection pass centered on the first pass time with a reduced Correlator Spacing Interval (DSI). In the first pass DSI was equal to the Transmitted Hop Interval (TFI) divided by two. For the second pass DSI is reduced. In one embodiment, DSI is reduced by a factor of 2 to 15, or more.

The difference for C between two adjacent correlators that both lead or lag the transmitted hop on-time point is still equal to the Correlator Spacing Interval (DSI) divided by the Transmitted Hop Interval (THI). For the case where the spacing interval is 1/15 of the hop interval, DSI becomes 0.06667. In the case where the correlators are not adjacent then the above formulas need to be revised to the Interval Between Hoppers (IBH) divided by THI. This allows widening of the time base during the second pass since so many correlators are in partial alignment with the signal.

Figure 5:
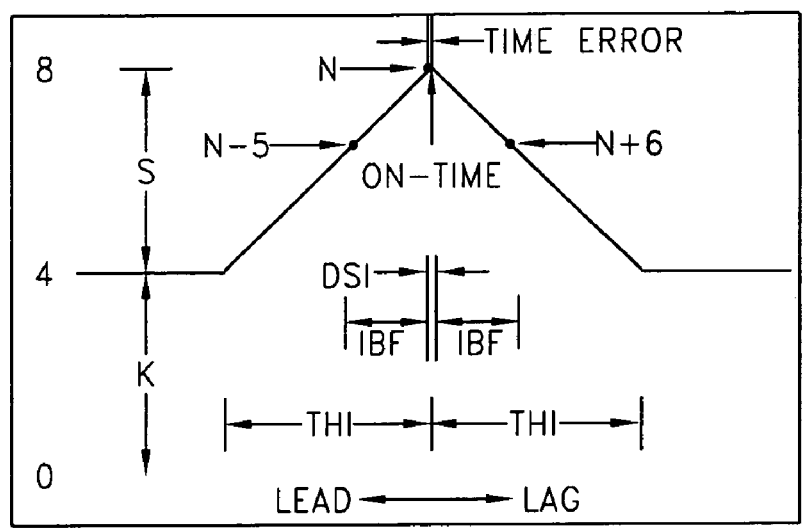
FIG. 5 shows lead and lag timing during a second pass of the frequency hop correlator.

In the first pass, it was possible for $H_N$ to be on the proper frequency only 75% of the time leading to a 2.5 dB loss. In this second pass $H_N$ and $H_{N+1}$ will be aligned at least 96.67% of the time so the maximum loss experienced by either is only 0.3 dB. Since the levels of these two correlators is nearly identical, it is possible to double-up on the calculations using two correlators on each side of the peak to get a better average result. To determine which of the other correlators should be used in the calculations, an acceptable loss in that correlator needed to be established. In one embodiment, an acceptable loss is set at 3 dB plus the average gain experienced in $H_N$ and $H_{N+1}$ as a result of the closer correlator spacing. This works out to 4.1 dB and based on that correlators (N−5) and (N+6) were selected for the equations, as shown in FIG. 5. Assuming the on-time point resides between correlators N and (N+1) then correlators N and (N−5) are both leading the On-Time point while (N+1) and (N+6) lag and IBH can be calculated using (5*DFI)/TFI). This equals 1/3 and S can be calculated using;

$$(H_N-H_{N-5})+(H_{N+1}-H_{N+6})=(((C_N*S)+K)-((C_{N-5}*S)+K))+(((C_{N+1}*S)+K)-((C_{N+6}*S)+K))$$

Which simplifies to;

$$(H_N-H_{N-5})+(H_{N+1}-H_{N+6})=((C_N-C_{N-5})+(C_{N+1}-C_{N+6}))*S$$

S can then be found by substituting 1/3 for $(C_N-C_{N-5})$ and for $(C_{N+1}-C_{N+6})$ and rewriting the equation as;

$$S=1.5*((H_N-H_{N-1})+(H_{N+1}-H_{N+6}))$$

Similarly, the sum for C of a set of correlators that span the On-Time point can be calculated using (2−((DFI+IBH)/TFI)) and for the case where the spacing interval is 1/15 of the hop interval the sum of these two coefficients is 1.6. Again assuming the On-Time point resides between correlator N and (N+1) then K can be calculated using;

$$(H_N+H_{N+6})+(H_{N+}H_{N+6})=(((C_N*S)+K)+((C_{N+6}*S)+K))+(((C_{N+1}*S)+K)+((C_{N-5}*S)+K))$$

Which simplifies to;

$$(H_N+H_{N+6})+(H_{N+1}+H_{N-6})=((C_N+C_{N+6})+(C_{N+1}+C_{N-5}))*S+4K$$

K can then be solved for by substituting 1.6 for $(C_N+C_{N+6})$ and for $(C_{N+1}+C_{N-5})$ and rewriting the equation as;

$$K=(((H_N+H_{N+6})+(H_{N+1}+H_{N-5}))-3.2S)/4$$

If the equation;

$$H=(C*S)+K$$

is rewritten;

$$C=(H-K)/S$$

then $C_N$ can be calculated for correlator $H_N$ using the established values for S and K. Once $C_N$ has been determined the following calculation gives an estimate of the amount of time (Time Error) that correlator $H_N$ Leads the On-Time point by.

$$\text{Time Error}=(1-C_N)*THI$$

Although described above in connection with particular embodiments of the present invention, it should be understood that the descriptions of the embodiments are illustrative of the invention and are not intended to be limiting. Various modifications and applications may occur to those skilled in the art without departing from the true spirit and scope of the invention. The invention is limited only by the claims, which follow.

What is claimed is:

1. A fast acquisition system comprising:
   a fast acquisition processor configured to produce a time estimate for acquiring a coded signal having an associated frequency hop acquisition signal, said fast acquisition processor comprising a plurality of fast acquisition correlators; and
   control logic configured to provide a first time estimate and a first time delta value to said plurality of a fast acquisition correlators for a first pass through said fast acquisition processor, said control logic further configured to provide a second time estimate produced by said first pass through said fast acquisition processor, and a second time delta value to said plurality of fast acquisition correlators, for a second pass through said fast acquisition processor, said second pass through said fast acquisition processor producing a third time estimate.

2. The fast acquisition system of claim 1, said fast acquisition processor configured to produce said second time estimate according to a magnitude of the data produced by an n'th correlator in said plurality of correlators.

3. The fast acquisition system of claim 1, said fast acquisition processor configured to produce said second time estimate according to a magnitude of the data produced by an n'th correlator in said plurality of correlators and according to two correlators adjacent in time to said n'th correlator.

4. The fast acquisition system of claim 1, said fast acquisition processor configured to produce said third time estimate according to a magnitude of the data produced by an n'th correlator in said plurality of correlators.

5. The fast acquisition system of claim 1, said fast acquisition processor configured to produce said third time estimate according to a magnitude of the data produced by an n'th correlator in said plurality of correlators, and according to two correlators removed in time from said n'th correlator.

6. The fast acquisition system of claim 1, wherein said second time delta value is smaller than said first time delta value.

7. In a fast acquisition processor, comprising a plurality of fast acquisition correlators, a method for fast acquisition comprising:
    providing a first time estimate and a first time delta value to a said fast acquisition correlators;
    executing a first pass through said fast acquisition processor to produce an output comprising a second time estimate;
    providing said second time estimate and a second time delta value to said fast acquisition correlators; and
    executing a second pass through said fast acquisition processor to produce an output comprising a third time estimate.

8. The method of claim 7, wherein said second time estimate is located by locating a correlator $H_N$, having a largest magnitude in said plurality of correlators spaced according to said first time delta value.

9. The method of claim 7, wherein said second time estimate is located by locating correlator $H_N$, $H_{N-1}$ and $H_{N+1}$, in said plurality of correlators spaced according to said first time delta, said correlator $H_N$ having a largest output magnitude of said correlators in said plurality of correlators.

10. The method of claim 9, wherein said correlator $H_{N-1}$ and $H_{N+1}$, are adjacent in time to said correlator $H_N$.

11. The method of claim 7, wherein said third time estimate is located by locating correlator $H_N$, $H_{N-5}$ and $H_{N+6}$, in said plurality of correlators spaced according to said second time delta, said correlator $H_N$ having a largest output magnitude of said correlators in said plurality of correlators.

12. The method of claim 7, wherein said second time delta value is smaller than said first time delta value.

13. A fast acquisition system comprising:
    means for producing a time estimate for acquiring a coded signal having an associated frequency hop acquisition signal; and
    means for providing a first time estimate and a first time delta value to said means for producing as inputs for a first acquisition pass, said means for providing further configured to provide a second time estimate produced by said first pass and a second time delta value to said means for producing as inputs for a second fast acquisition pass, said second acquisition pass producing a third time estimate.

14. A fast acquisition system comprising:
    a fast acquisition processor configured to produce a time estimate for acquiring a coded signal having an associated frequency hop signal; and
    control logic configured to provide a first time estimate and a first time delta value to said fast acquisition processor as inputs for a first acquisition pass, providing a second time estimate produced by said first pass and a second time delta value to said fast acquisition processor as inputs for a second acquisition pass, said second acquisition pass producing a third time estimate.

* * * * *